United States Patent [19]
Schoenfeld et al.

[11] Patent Number: 6,153,722
[45] Date of Patent: Nov. 28, 2000

[54] CHOLESTERIC LIQUID-CRYSTAL POLYMERS WITH INCREASED WEATHER STABILITY

[75] Inventors: Axel Schoenfeld, Wiesbaden; Andreas Stohr, Kriftel, both of Germany

[73] Assignee: Clariant GmbH, Frankfurt, Germany

[21] Appl. No.: 09/287,503

[22] Filed: Apr. 7, 1999

[30] Foreign Application Priority Data

Apr. 11, 1998 [DE] Germany ............ 198 16 268

[51] Int. Cl.⁷ .................................. C08G 64/00
[52] U.S. Cl. ...................... 528/299.1; 252/299.1
[58] Field of Search ............. 252/299.01; 528/196

[56] References Cited

U.S. PATENT DOCUMENTS

| | | | |
|---|---|---|---|
| 5,362,315 | 11/1994 | Müller-Rees et al. | 106/493 |
| 5,780,629 | 7/1998 | Etzbach et al. | 544/296 |

FOREIGN PATENT DOCUMENTS

| | | |
|---|---|---|
| 0391368 | 10/1990 | European Pat. Off. . |
| 0724005 | 7/1996 | European Pat. Off. . |
| 4240743 | 6/1994 | Germany . |
| 4342280 | 6/1995 | Germany . |
| 19538700 | 4/1997 | Germany . |
| 19602848 | 7/1997 | Germany . |
| PCT/EP97/00278 | 1/1996 | WIPO . |
| WO 97/14739 | 4/1997 | WIPO . |

*Primary Examiner*—Terressa M. Boykin
*Attorney, Agent, or Firm*—Susan S. Jackson; Scott E. Hanf

[57] ABSTRACT

The invention relates to a cholesteric liquid-crystalline polymer which in the molecule comprises at least one stabilizer comonomer from the group consisting of UV absorbers and antioxidants.

15 Claims, No Drawings

CHOLESTERIC LIQUID-CRYSTAL POLYMERS WITH INCREASED WEATHER STABILITY

CROSS-REFERENCE TO RELATED APPLICATION

The present invention is described in the German priority application No. 198 16 268.5, filed Apr. 11th 1998, which is hereby incorporated by reference and is fully disclosed herein.

BACKGROUND OF THE INVENTION

Cholesteric liquid-crystal polymers are known, for example, from DE-A-42 40 743, EP-A-0 724 005 and DE-A-195 38 700.

They possess a twisted structure with a pitch that corresponds to a wavelength of light in the range from UV to IR. Cholesteric liquid crystals, or generally liquid-crystalline substances with a chiral phase, which possess a twisted structure with a desired pitch, can be obtained, for example, from nematic liquid-crystal polymers (LCPs) by doping them with a chiral substance or incorporating the chiral substance into the polymer. The nature and proportion of the chiral substance determine the pitch of the twisted structure and thus the wavelength of the reflected light. The twist of the structure can be either left- or right-handed. Moreover, the starting substances possess groups which are amenable to addition polymerization, polycondensation or polyaddition.

Depending on the content of chiral monomer, the material displays pronounced color effects which are based on selective reflection at the helical superstructure. The exact reflection color here depends on the viewing angle and, in particular, on the pitch of the helix. For a given viewing angle—for example, perpendicular viewing of a sample—the reflection color which appears is a color with a wavelength which corresponds to the pitch of the helical superstructure. So the smaller the pitch of the helix, the shorter the wavelength of the reflected light.

In the majority of cases, cLPCs comprise aromatic molecular units. These are hampered by the disadvantage of deficient weather stability as a result, for example, of strong UV absorption.

It is known that polymerized compounds can be improved in their UV stability by the admixture of UV stabilizers. Whereas this concept is established and functions well for amorphous and partially crystalline systems, it has not to date been applicable to liquid-crystalline substances, since the liquid-crystalline phases are, as a general rule, immiscible with non-liquid-crystalline components. A UV stabilizer mixed into a liquid-crystalline substance is exuded over the course of time; in other words, there is separation, and the UV stabilizer is no longer able to protect the liquid-crystalline substance.

SUMMARY OF THE INVENTION

The invention relates to cholesteric liquid-crystal polymers (cLCPs) having optically variable properties and increased weather stability.

It was therefore the object of the invention to provide a material which in addition to having a liquid-crystalline structure with optically variable properties is of increased weather stability.

It has been found that the disadvantages described in the prior art can, surprisingly, be circumvented by chemical incorporation of derivatized stabilizers, without any loss of the prized optically variable properties.

The present invention therefore provides cholesteric liquid-crystalline polymers which in the molecule comprise at least one stabilizer comonomer from the group consisting of UV absorbers, such as o-hydroxybenzophenones, 2-(o-hydroxyphenyl)benzotriazoles and phenyl salicylates, for example, or from the group of antioxidants, such as sterically hindered phenols, sterically hindered amines, phosphines, phosphites, phosphonites, thiocarboxylic esters and alkyl sulfides, for example.

DESCRIPTION OF THE PREFERRED EMBODIMENTS

In particular, said stabilizer comonomers are, or comprise, molecules, or molecular portions respectively, which as UV absorbers absorb the harmful radiative energy in the photochemically effective range and emit that energy usually in the form of heat or which, as free-radical scavengers or peroxide destroyers, contribute to protecting the polymers against oxidation.

In order to bond covalently to the cLCP said stabilizer comonomers must possess one or more, preferably one or two, polycondensable groups, examples being hydroxyl, carboxyl and/or amino groups.

The cLCPs on which the invention is based embrace cholesteric liquid-crystalline main-chain polymers, cholesteric liquid-crystalline side-group polymers, and combined cholesteric main-chain/side-group polymers. The polymers of the invention may be uncrosslinked or crosslinked. To produce crosslinked systems it is possible to subject crosslinkable but as yet uncrosslinked polymers to crosslinking after orientation in the cholesteric phase.

Cholesteric liquid-crystalline main-chain polymers of the invention are preferably liquid-crystalline polyesters, polyamides, polycarbonates, polyesteramides and/or polyesterimides which comprise aromatic and/or cycloaliphatic hydroxycarboxylic acids, aromatic aminocarboxylic acids, aromatic and/or cycloaliphatic dicarboxylic acids and aromatic and/or cycloaliphatic diols and/or diamines and one or more chiral, bifunctional comonomers and also one or more of said comonomers which act as stabilizers.

The chiral, bifunctional comonomers are preferably employed in an enantiomerically pure form. If enantiomer mixtures of a comonomer are used, it should be ensured that one enantiomeric form is present in an effective excess. Among the chiral comonomers, particular preference is given to those derived from sugars, terpenes, camphoric acid, tartaric acid, binaphthyl derivatives or biphenyl derivatives. In the case of the sugars, particular interest attaches to pentoses and hexoses and their derivatives. Particular preference is given to camphoric acid, isosorbide or isomannide, and derivatives thereof that are suitable for addition polymerization.

For the purposes of the present invention, preference is given to cholesteric liquid-crystalline main-chain polymers consisting essentially of a) from 0 to 99 mol % of one or more compounds from the group consisting of aromatic hydroxycarboxylic acids, cycloaliphatic hydroxycarboxylic acids and aromatic aminocarboxylic acids;

b) from 0 to 49.5 mol % of one or more compounds from the group consisting of aromatic dicarboxylic acids and cycloaliphatic dicarboxylic acids;

c) from 0 to 49.5 mol % of one or more compounds from the group consisting of aromatic and cycloaliphatic diols and diamines;

d) from 0.95 to 40 mol %, preferably from 2 to 25 mol % and, in particular, from 4 to 20 mol % of chiral, bifunctional comonomers;

e) from 0 to 15 mol % of a component having more than two functional groups; and f) from 0.05 to 10 mol %, preferably from 0.1 to 2 mol %, of one of said comonomers which acts as a stabilizer, the result of the sum being 100 mol %.

In the context of the percentages indicated, care should be taken to ensure the stoichiometry of the functional groups for the polycondensation (said stoichiometry is known to the skilled worker); that is, to employ appropriate proportions of functional groups which react with one another in the polycondensation reaction. When using dicarboxylic acids and diols, for example, the number of hydroxyl groups present must correspond to the number of carboxyl groups. In addition, the polymers may also include components having only one functional group or having more than two functional groups (component e), examples being tricarboxylic acids, dihydroxycarboxylic acids or triols, especially dihydroxybenzoic acid, trihydroxybenzenes or trimellitic acid. In this way, the molecular weights of the polymers can be influenced, and crosslinked or partially crosslinked polymers are obtained.

Particular preference is given to cholesteric main-chain polymers composed of the following structural units of the individual monomer groups:

a) aromatic hydroxycarboxylic acids, aminocarboxylic acids: hydroxybenzoic acids, hydroxynaphthalenecarboxylic acids, hydroxybiphenylcarboxylic acids, aminobenzoic acids, hydroxycinnamic acids;

b) aromatic dicarboxylic acids, aliphatic dicarboxylic acids: terephthalic acid, isophthalic acid, biphenyldicarboxylic acids, naphthalenedicarboxylic acids, cyclohexanedicarboxylic acids, pyridinedicarboxylic acids, diphenyl ether dicarboxylic acids, carboxycinnamic acids and also

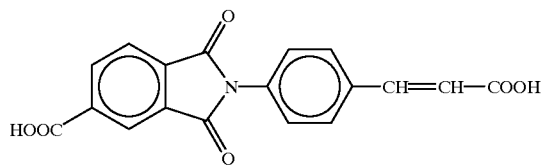

and

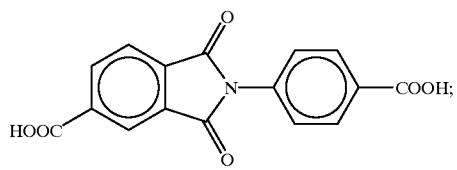

c) aromatic diols, aminophenols, diamines: hydroquinones, dihydroxybiphenyls, tetramethyldihydroxybiphenyls, naphthalenediols, dihydroxydiphenyl sulfones, dihydroxydiphenyl ethers, dihydroxyterphenyls, dihydroxydiphenyl ketones, phenylenediamines, diaminoanthraquinones, dihydroxyanthraquinones and also

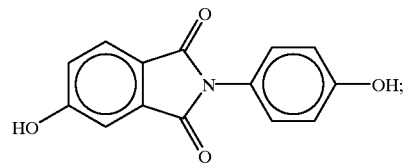

d) chiral, bifunctional monomers: isosorbide, isomannide, isoidide, camphoric acid, (D)- or (L)-methylpiperazine, (D)- or (L)-3-methyladipic acid, butane-2,3-diol and also

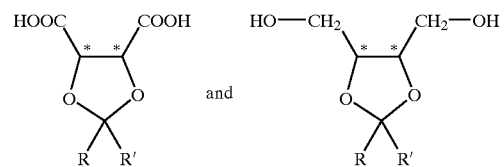

e) aromatic phenols or carboxylic acids having a total of more than two hydroxyl or carboxyl groups, examples begin dihydroxybenzoic acid, trihydroxybenzenes, benzenetricarboxylic acids, and perylenetetracarboxylic acid;

f) comonomers comprising the following molecular units: o-hydroxybenzophenones, such as

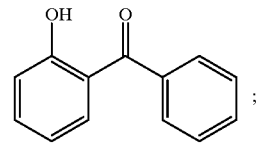

2-(o-hydroxyphenyl)benzotriazoles, such as

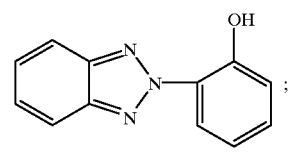

phenyl salicylates, such as

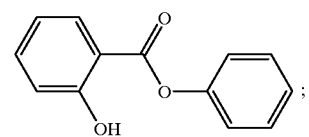

sterically hindered phenols, such as

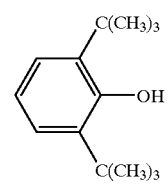

sterically hindered amines, such as

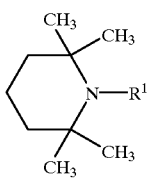

phosphines, such as

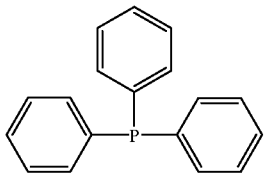

phosphites, such as

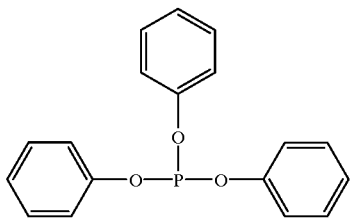

phosphonites, such as

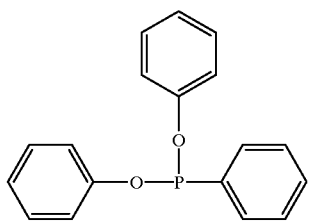

aryl sulfides, such as

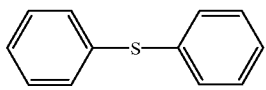

Particularly preferred main-chain polymers comprise camphoric acid and/or isosorbide as chiral component and also p-hydroxybenzoic acid and/or 2-hydroxy-6-naphthoic acid and/or terephthalic acid and/or isophthalic acid and/or hydroquinone and/or resorcinol and/or 4,4'-dihydroxybiphenyl and/or 2,6-naphthalenedicarboxylic acid, and also abovementioned comonomers as component f).

The main-chain polymers can be prepared by a customary polycondensation reaction. A suitable example is the melt condensation with acetic anhydride that is described in DE 195 38 700 A1 or EP-A-0 391 368.

Examples of cholesteric liquid-crystalline side-group polymers for the purposes of the present invention are polyesters or polyamides with mesogens, a chiral group and a stabilizer group (component f) in the side group.

The mesogenic monomers on which the side-group polymers are based are preferably those of the formula (1)

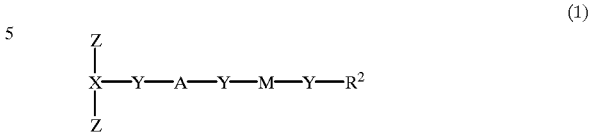

in which

X can be $C_1$–$C_{12}$-alkyl, aryl, heteroaryl or diphenylmethyl,

Y is identical or different at each occurrence and is a chemical bond, O, S, COO, OCO, OCOO, CON(R) or N(R)CO, where R is hydrogen or $C_1$–$C_4$-alkyl, A is a chemical bond or a spacer from the group consisting of $C_1$–$C_{30}$-alkyl, preferably $C_2$–$C_{12}$-alkyl, where the alkyl chain can be interrupted by one or more—for example, 1, 2, 3 or 4—groups of the formulae O, S, NH or $NCH_3$ and where the alkyl chain can be substituted by fluoro, chloro, bromo, cyano, methyl or ethyl, M is a mesogenic group, Z is a polycondensable group, which can be identical or different at each occurrence, preferably OH, COOH or $NH_2$, and $R^2$ is a monovalent radical, for example, H, $C_1$–$C_6$-alkyl, aryl or $C_2$–$C_6$-acyl, preferably H, $CH_3$, $C_2H_5$, $COCH_3$ or $C_6H_5$.

Particularly preferred definitions of X are $C_1$–$C_{12}$-alkyl, phenyl, pyridyl and pyrimidyl.

Particularly preferred definitions of A are radicals of the formulae —$(CH_2)_p$—, —$(CH_2CH_2O)_m$—, —$CH_2CH_2$—S—$CH_2$—$CH_2$— and —$CH_2CH_2$—NH—$CH_2CH_2$—, where m is a number from 1 to 3 and p is a number from 1 to 12.

Particularly suitable radicals M are cycloaliphatic, aromatic or heteroaromatic radicals of the formula (2)

$$-(D-Y_1)_r-D-\qquad(2)$$

in which the radicals

D independently of one another are $C_5$–$C_6$-cycloalkylene, an aromatic, such as $C_6H_5$, or heteroaromatic, such as pyrimidine, which are unsubstituted or substituted by fluoro, chloro, bromo, cyano, methyl, methoxy or nitro;

$Y_1$ is O, COO, OCO, $CH_2O$, $OCH_2$, CH=N, N=CH or a direct bond, and r is a number from 0 to 3.

Preferably, r is zero or 1.

Particularly preferred mesogenic groups are described in DE 42 28 280 A1 and DE 19 602 848 A1, but particular preference is given to

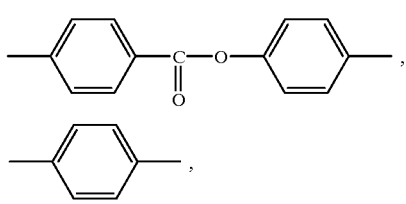

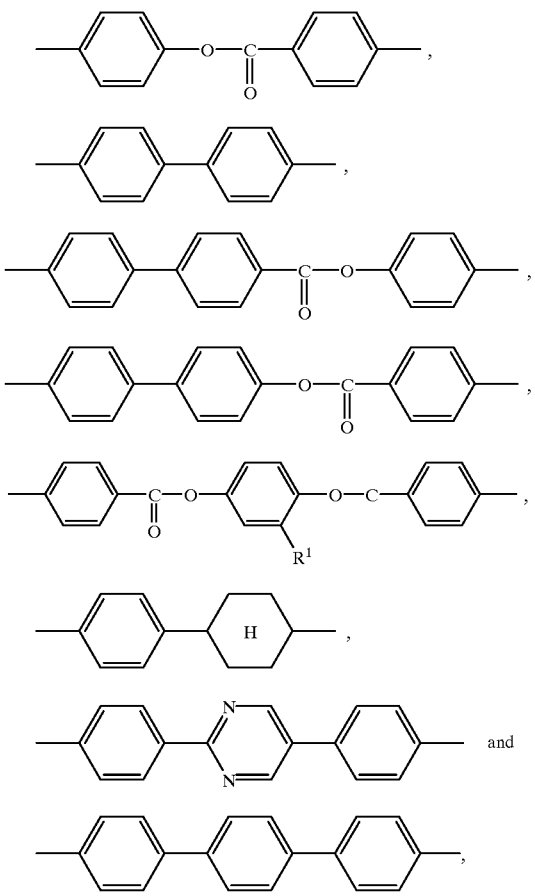

The mesogenic monomers of the formula (1) can be either achiral or chiral. In the case of chiral monomers of the formula (1), the chiral group can be a constituent alternatively of the spacer A, of the mesogenic group M or of the radical $R^2$. In order to obtain a variable color impression within the meaning of the present invention using side-group polymers, it is preferred to employ mixtures of chiral and achiral compounds of the formula (1).

In order to be able to bind the comonomers that are effective as stabilizers chemically to the cLCP, at least one polycondensable group must be present within the molecule.

In the case of the main-chain polymers, use is made in particular of compounds from the group consisting of

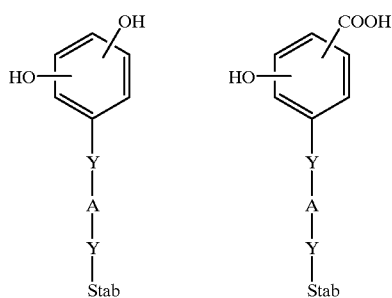

in which A and Y are as defined above and Stab is a stabilizer component. With particular preference, the radical "Stab" is one of the following molecular components:

in the case of UV absorbers:

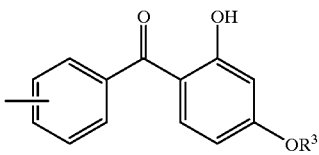

where $R^3$ = H, $C_1$–$C_{12}$-alkyl

-continued

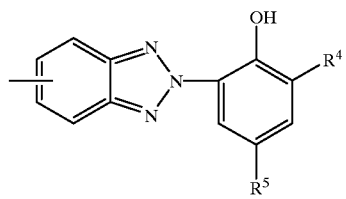

where $R^4$, $R^5$ = H, methyl, ethyl, i-propyl, t-butyl, 2-phenylpropyl

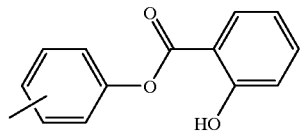

in the case of sterically hindered phenols:

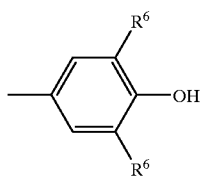

in the case of sterically hindered amines:

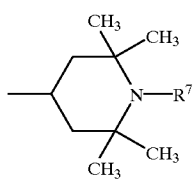

in the case of phosphines:

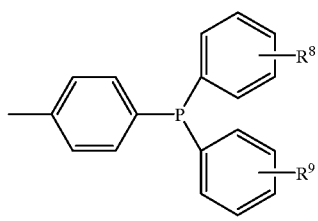

in the case of phosphites:

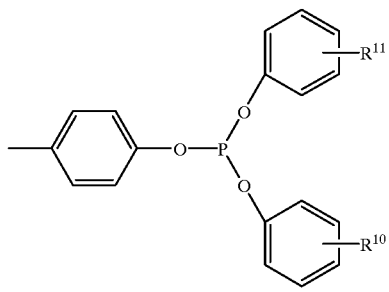

in the case of phosphonites:

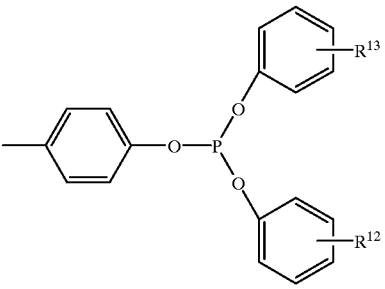

and also

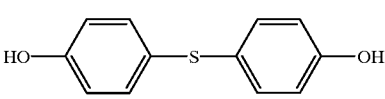

However, it is also possible to employ a compound of the formula (3)

$$H-Y-A-Y-Stab \qquad (3)$$

which is attached by condensation to the polymer main chain in the course of the polycondensation.

In the case of the side-group polymers, compounds of the formula (4)

in particular are incorporated as stabilizers into the polymer chain; in this formula, Z, X, Y, A and Stab are as defined above.

Examples of compounds of the formula (4) are:

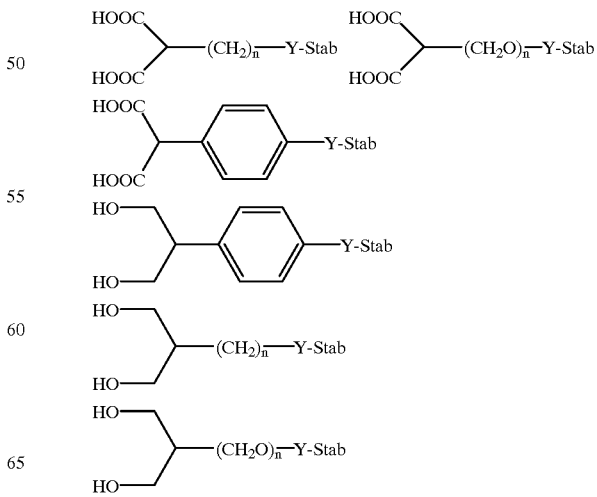

-continued

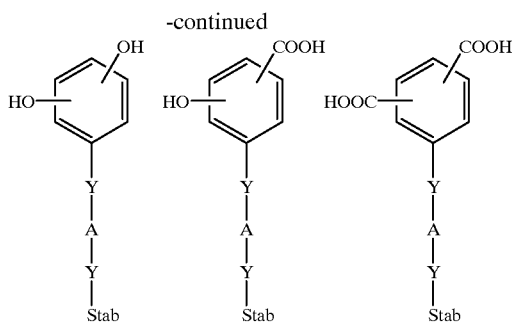

where Y, A and Stab are as defined above and n is a number from 1 to 12, preferably from 1 to 6.

The present invention additionally provides a process for preparing the weather-stabilized cLCPs, which comprises mixing the constituent monomers with one another and subjecting the mixture to polymerization, or comprises first preparing a nematic LCP and reacting it with a chiral polymerizable compound and a polymerizable stabilizer comonomer, or comprises first preparing a cholesteric LCP and reacting it with a polymerizable stabilizer comonomer, or comprises preparing a polymer blend comprising at least one cLCP and at least one LCP, which can be nematic or cholesteric, comprising a stabilizer comonomer.

Either the individual components can be employed directly as low molecular mass monomers, or reactive derivatives of these monomers, examples being carboxylic chlorides, carboxylic esters and acetylated hydroxy compounds, or low molecular mass or polymeric components can be reacted with one another or with a polymer which already includes a portion of the components.

It is possible, for example, for the chiral component and the stabilizer comonomer to be united in one molecular unit and for this unit to be polymerized with the remaining components.

The polymerization can be conducted by customary methods: for example, by polycondensation in the melt, in solution or in emulsified or disperse phase. The condensation judiciously takes place at temperatures from 0 to 200° C., preferably from 20 to 180° C., advantageously in the presence of a base.

The liquid-crystalline polymers can be admixed with from 0 to 10% by weight, preferably from 0 to 5% by weight, based on the overall weight, of customary auxiliaries and additives from the group consisting of flow additives (e.g., polyacrylates and polyesters, as are used in powder coating systems), antistats, and optical brighteners.

Auxiliaries and/or additives are mixed with the cholesteric liquid-crystal polymer until distribution is homogeneous. Mixing takes place most favorably in the melt of the cholesteric liquid-crystal polymer. Mixing can be carried out with all mixing equipment suitable for the purpose, examples being dispersion kneaders, ®Banburry kneaders or screw kneaders, or by extrusion in, for example, a single-screw or twin-screw extruder. In the case of extrusion in particular it is also possible to start from a pulverulent mixture of the additives with the cholesteric liquid-crystalline polymer.

The polymers of the invention can be subjected to further processing in the form of a material of construction. A material of construction is a shaped structure such as, for example, injection moldings, extruded profiles or pipes, tapes, sheets or fibers.

The polymers of the invention are particularly suitable as a base material for producing effect coatings of all kinds, such as, for example, powder effect coatings, and for producing especially platelet-shaped effect pigments featuring a color effect which is dependent on the viewing angle, and increased weather and light stability.

Where the polymers of the invention are not obtained in the form of a finely divided powder directly from the synthesis, they can, for use as a coating material, be converted into a finely divided powder following synthesis. Where the synthesis is conducted as a melt condensation, an appropriate first comminution step after the synthesis is extrusion as a strand or strip. The resultant strands or strips can be converted in a known manner, using choppers or pelletizers, into chips or strand pellets. However, the polymers can also be isolated in other ways and then subjected to coarse comminution by means of cutting and sawing processes. Further comminution can be appropriately effected using milling equipment of all types and designs. In this case, the ultimate fineness required can be achieved in one process step or else in a number of substeps in identical or different types of mill. If the milling process conducted does not lead directly to the desired minimum fineness and particle-size distribution, then it is appropriate to subject the milled material, during or after the milling process, to sieving or classification procedures in order to ensure the desired minimum fineness and to obtain a desired, optimum particle-size fraction. Examples of suitable milling apparatus are mills of the vibrating, vibrating-disc, disc, planetary, centrifugal, mortar, ball, cross beater, rotor beater, cutting, hammer, blade, rotor-stator, impact-plate and, in particular, ultracentrifugal, universal, pin, and air-jet types. In specific cases it is also possible to carry out wet milling in ballmills, sandmills, vibrating mills or beadmills.

Milling of the polymers of the invention can be omitted if they are prepared by polymerization in an emulsified or dispersed phase, which generally results in a finely divided powder.

Powder effect coatings can be applied by the following preferred methods: the finely divided polymer powder is electrostatically charged in the course of the spraying process. In the case of the corona process this is effected by guiding the powder past a charged corona, during which the powder itself becomes charged. In the case of the triboelectric or electrokinetic process, the principle of triboelectricity—frictional electricity—is used. Within the spraying device, the powder receives an electrostatic charge which is opposite to the charge of the friction partner, generally a hose or spraying pipe (made of polytetrafluoroethylene, for example). The electrostatic charging leads to a high degree of deposition of the powder on the article that is to be coated. Following the process of application to the article, the powder coat is heated to temperatures above the softening point of the powder, at which the polymers form a homogeneous film and the helical superstructures are formed. The temperature at which formation of the helical structure begins is referred to below as the chiralization temperature.

The specific optical properties of a powder effect coating are not observed until the molecules, above the chiralization temperature of the polymer, form the helical structure. Transition to the cholesteric phase takes place in many cases as early as during the synthesis of the polymers. The wavelength of selective reflection of the cLCPs employed in accordance with the invention is determined by the pitch of the helical structure. The pitch is dependent on the structure of the polymer, on the melt viscosity, on the presence of solvents, and, in particular, on the helical twisting power of the chiral monomer. In addition, it is a function of temperature. Accordingly, the pitch of the helix can also be adjusted by means of the temperature. If the coated substrates are cooled rapidly, the pitch of the helix, and thus the selective reflection, can be "frozen in" permanently. In the case of slow cooling, changes in color properties must be expected. In general, colored substrates are obtained in this way too. However, it is difficult to determine the final color properties beforehand. If the cooled substrate is heated again, then it is possible to establish new helical pitches, or the same pitches again, and thus to adjust the wavelength of selective reflection. Through this operation the color properties of the coated substrate can be corrected and varied in a simple manner. For practical application it is important that the melting point and the chiralization temperature of the polymer lie above the service temperature of the coated substrate.

The formation of the helical structure can also be promoted by the temperature, the action of shear forces, and by substrates having polymeric coats, such as, for example, polyvinyl alcohol, cellulose derivatives and polyimides. Depending on the structure of the polymers, the orientation process of the polymer molecules may also be positively influenced by electrical and magnetic fields.

A further, preferred possibility for coating articles with pulverulent substances is by flame spraying. In this process, the powder is fluidized with a carrier gas (in a fluidized bed, for example) and supplied to the central nozzle of a flame spraygun. At the same time, in the flame spraygun, a fuel-gas/oxygen mixture is produced which is burnt in numerous small flamelets arranged in an annular configuration around the center. The pulverulent particles then melt and are subsequently deposited, on the article that is to be coated, in the form of droplets which, in the course of the spraying process, coalesce to form a film. This technique offers the particular advantage that the melting operation is integrated into the spraying process, so that application of the coating to the article, and film formation, can be done in one operation.

Another preferred embodiment for powder coating is the fluidized-bed sintering technique. For this technique, a fluidized bed is generated in an appropriate container with the aid of a carrier gas and the polymer powder of the invention. The article to be coated is heated, in a separate thermal chamber, to the temperature required for coating, and after reaching this temperature it is immersed for a certain period in the fluidized bed. In the course of this immersion, pulverulent particles remain adhering to the surface of the article, then melt, coalesce to form a film, and develop the helical structure. In some cases it is advantageous to subject the coated article to an additional thermal treatment in order to improve film formation and the orientation of the polymer molecules. In other cases, the article can be cooled in air or quenched with water. This technique, too, offers the particular advantage that the melting operation is integrated into the coating process, so that application of coating to the article, orientation of the polymer molecules, and film formation can be done in one operation.

In all of the powder coating techniques described, and especially with the fluidized-bed sintering and flame spraying technique, the particle morphology and thus the flowability of the powder, and also its particle-size distribution, are of great importance. Preference is given to particles that are as close as possible to spherical and have a narrow size distribution. Spherical particles are obtained readily in processes where polymerization is conducted in an emulsified or dispersed phase. Depending on the type of mill employed, the milling processes lead to narrower or broader particle-size distributions. In some cases it is advantageous to follow milling by a sieving, classification or screening process in order to obtain a particle-size distribution that is as narrow as possible. In other cases it is advantageous first of all to prepare a very finely divided powder which can subsequently be subjected to controlled agglomeration to give the desired particle size.

The desired particle size is critical for the coat thickness of the effect powder coating, the nature of the article to be coated, and the application technique employed. If thin coats are desired on the article that is to be coated, then the target average particle size of the powder is between 1 and 100 $\mu$m, preferably between 15 and 80 $\mu$m. Where thick coats are desired on the article, as are normally applied in fluidized-bed sintering and flame spraying, a mean particle size of between 80 and 300 $\mu$m, preferably from 100 to 250 $\mu$m, is advantageous. In the case of fluidized bed sintering and flame spraying it is particularly important to observe the limits on particle size. Excessively small particles are heated too strongly by the high flame temperatures, and become carbonized or are blown away by the flow of gas. Excessively coarse particles, on the other hand, are not melted completely and are unable to undergo optimum orientation in the course of subsequent film formation. In exceptional cases, however, it may also be advantageous to use a particle-size distribution which lies outside this range.

Effect powder coatings can be applied to a wide variety of substrates. These substrates may, for example, be articles made from natural and synthetic materials such as, for example, wood, plastics, metal or glass. If the effect coating is applied without a prior coating, then it is advisable to apply it in a coat thickness which masks the substrate. It is of course also possible to apply a plurality of coats or to produce semitransparent coatings. Particular preference is given to coating the bodywork, or parts of the bodywork, of motor vehicles.

In preferred cases, the effect powder coating is applied to metal or plastic substrates. In the majority of cases these will have been given a coating beforehand. This means that plastic substrates can be provided with a plastic primer, and metallic substrates generally possess an electrophoretically applied primer with or without one or more further coats such as, for example, a surfacer coat.

Particular preference is given to dark substrates. The term dark substrate in this context refers not only to a substrate whose surface is given a dark coat but also to an inherently dark-colored substrate, for example, a plastic substrate or a metal substrate which has been coated with a dark oxide layer. Examples of dark coats are electrophoretically applied, spray-applied or powder-coated primers, plastics primers, surfacer coats and antistonechip coats, and solid-color undercoats and topcoats. Examples of dark substrate backgrounds are dark red, dark blue, dark green, dark brown, dark gray and, in particular, black. Powder coatings can also be applied to light-colored backgrounds or in hiding coats. In that case, however, the viewing-angle-dependent perceived color is expressed only to a weakened extent.

Effect powder coatings can be coated with a clearcoat by customary methods. Suitable clearcoats are in principle all known clearcoats or transparent-pigmented coating compositions. In this context it is possible to employ both solvent-borne one component or two-component coating materials and also, preferably, water-dilutable clearcoats and, in particular, powder coating materials. In some cases it may be judicious to choose a somewhat thicker clearcoat or to apply 2 coats of identical or different liquid clearcoats or transparent powder coating materials.

A further possibility of converting the cholesteric liquid-crystalline polymers into effect coatings is by solvent coating. In this case, the polymer is dissolved in a solvent and, from the solution, a film is applied to the target substrate. This can be done by means, for example, of spraying, knife coating, flow coating, or dipping, or with a brush. Following the evaporation of the solvent, the polymer forms a bright effect coating.

A further possibility of converting the cholesteric liquid-crystalline polymers into effect coatings is by melt coating. In this instance the polymer in the melt is drawn onto the substrate or applied to the substrate by melting and is processed to form a thin coat. The polymer can suitably be applied using, for example, a heatable coating bar. Alternatively, application can be made with simpler means, such as a trowel or filling knife, for example.

The polymers of the invention can also be used to produce effect pigments. For this purpose the polymers, preferably cholesteric main-chain polymers, are applied in the melt, for example, or in a dispersion, to a carrier. A suitable carrier is a film or rotating roller, for example. Application can be made with a coating bar. However, other forms of application, such as spraying or printing, are also suitable. The applied layer judiciously has a thickness of between 1 $\mu$m and 100 $\mu$m, preferably between 1 $\mu$m and 25 $\mu$m. Since the cholesteric liquid crystals exhibit the desired optical effects only in the oriented state, good orientation must be ensured. In some cases, the cLCPs undergo spontaneous orientation, although it may otherwise be necessary to employ methods for improving orientation that are known to the skilled worker, examples being thermal treatment, shear forces, or orientation layers.

Subsequently, the film is detached from the carrier and comminuted to the desired platelet size by customary methods. It must be ensured that a platelet-shaped geometry is still present; that is, the platelet diameter should be at least two to three times the platelet thickness. For instance, the platelet thickness should lie within the range from 1 to 100 $\mu$m, preferably between 1 and 25 $\mu$m and, in particular, between 3 and 15 $\mu$m. The platelet diameter lies within the range from 10 to 250 $\mu$m, preferably between 20 and 90 $\mu$m.

The effect pigments of the invention are notable, in addition to their increased weather and light stability, for bright color effects which are dependent on the viewing angle.

Coating materials comprising the effect pigments of the invention can be used to coat natural and synthetic materials such as wood, metal or glass, for example, and especially for painting the bodies, or parts of the bodies, of motor vehicles.

The polymers of the invention and effect pigments produced from them can also be employed in components for contactless printing processes, such as in electrophotographic toners and developers and in inkjet inks, for example.

EXAMPLES

Example 1
Preparing an Uncrosslinked Main-chain Polymer 1.8 mol of 2-hydroxy-6-naphthoic acid, 4.8 mol of 4-hydroxybenzoic acid, 1.7 mol of 4,4'-dihydroxybiphenyl, 1.7 mol of (1R,3S)-(+)-camphoric acid and 0.1 mol of 4-hydroxy-2,2,6,6-tetramethylpiperidine are admixed with 10.25 mol of acetic anhydride and with 0.5 g of potassium acetate, and a gentle stream of nitrogen is flushed through. The mixture is heated to 150° C. over the course of 15 minutes and this temperature is maintained for 115 minutes. Subsequently, the temperature is raised to 300° C. over the course of 180 minutes and the melt is held at this temperature for 60 minutes. From about 220° C., acetic acid begins to distill off. Thereafter, nitrogen flushing is terminated and reduced pressure is applied. The melt is stirred under reduced pressure (about 5 mbar) for a further 30 minutes. The polymer is then subjected to nitrogen, cooled and isolated. When viewed straight on the polymer has a bright bluish green color, which appears violetish blue at an oblique viewing angle.

Example 2
Producing an Effect Pigment

The cholesteric liquid-crystal polymer employed is the polymer described in Example 1.

The polymer is milled to an average particle size of between 5 and 10 $\mu$m using an air-jet mill. A 30% dispersion of the milled material in isobutanol is prepared by stirring and the dispersion is drawn onto an aluminum foil with a coating bar whose gap width is 24 $\mu$m. Following the drying of the applied dispersion, the powder is baked at 280° C. for 5 minutes. The film has a bluish green color which appears violetish blue when viewed at an oblique angle. The cLCP layer is very well formed and homogeneous. The coat thickness is 8–11 $\mu$m.

To produce the effect pigment, the cLCP-coated aluminum foil is placed in half-concentrated hydrochloric acid, and the aluminum carrier film dissolves to leave the cholesteric polymer film. The polymer particles are milled in a universal mill. In order to narrow the particle-size distribution, the milled material is passed through a sieve with a mesh width of 63 $\mu$m. The resulting effect pigment is incorporated into a 2-component clearcoat, applied by spraying to a black-primed metal panel, and covered with clearcoat. After baking, the coating has a green color which appears blue when viewed at an oblique angle.

Example 3
Preparing an Uncrosslinked Main-chain Polymer 1.7 mol of 2-hydroxy-6-naphthoic acid, 4.8 mol of 4-hydroxybenzoic acid, 1.8 mol of 4,4'-dihydroxybiphenyl, 1.7 mol of (1R,3S)-(+)-camphoric acid and 1 mol of a mixture of 1,2,4,5-benzenetetracarboxylic acid 1,4- and 1,5-bis(2,2,6,6-tetramethyl-4-piperidyl) ester are admixed with 10.25 mol of acetic anhydride and with 0.5 g of potassium acetate, and a gentle stream of nitrogen is flushed through. The mixture is heated to 150° C. over the course of 15 minutes and this temperature is maintained for 115 minutes. Subsequently, the temperature is raised to 300° C. over the course of 180 minutes and the melt is held at this temperature for 60 minutes. From about 220° C., acetic acid begins to distill off. Thereafter, nitrogen flushing is terminated and reduced pressure is applied. The melt is stirred under reduced pressure (about 4 mbar) for a further 30 minutes. The polymer is then subjected to nitrogen, cooled and isolated. When viewed straight on the polymer has a bright green color, which appears blue at an oblique viewing angle.

Example 4
Producing an Effect Pigment

The cholesteric liquid-crystal polymer employed is the polymer described in Example 3.

The polymer is milled to an average particle size of between 5 and 10 $\mu$m using an air-jet mill. A 30% dispersion of the milled material in isobutanol is prepared by stirring and the dispersion is drawn onto an aluminum foil with a coating bar whose gap width is 24 $\mu$m. Following the drying of the applied dispersion, the powder is baked at 280° C. for 5 minutes. The film has a green color which appears blue when viewed at an oblique angle. The cLCP layer is very well formed and homogeneous. The coat thickness is 8–11 μm.

To produce the effect pigment, the cLCP-coated aluminum foil is placed in half-concentrated hydrochloric acid, and the aluminum carrier film dissolves to leave the cholesteric polymer film. The polymer particles are milled in a universal mill. In order to narrow the particle-size distribution, the milled material is passed through a sieve with a mesh width of 63 μm. The resulting effect pigment is incorporated into a 2-component clearcoat, applied to a black-primed metal panel, and covered with clearcoat. After baking, the coating has a green color which appears blue when viewed at an oblique angle.

Example 5
Preparing an Uncrosslinked Main-chain Polymer 1.7 mol of 2-hydroxy-6-naphthoic acid, 4.8 mol of 4-hydroxybenzoic acid, 1.8 mol of 4,4'-dihydroxybiphenyl, 1.7 mol of (1R,3S)-(+)-camphoric acid and 1 mol of a mixture of 1,2,4,5-benzenetetracarboxylic acid 1,4- and 1,5-bis(1,2,2,6,6-pentamethyl-4-piperidyl) ester are admixed with 10.25 mol of acetic anhydride and with 0.5 g of potassium acetate, and a gentle stream of nitrogen is flushed through. The mixture is heated to 150° C. over the course of 15 minutes and this temperature is maintained for 115 minutes. Subsequently, the temperature is raised to 300° C. over the course of 180 minutes and the melt is held at this temperature for 60 minutes. From about 220° C., acetic acid begins to distill off. Thereafter, nitrogen flushing is terminated and reduced pressure is applied. The melt is stirred under reduced pressure (about 5 mbar) for a further 30 minutes. The polymer is then subjected to nitrogen, cooled and isolated. When viewed straight on the polymer has a bright green color, which appears blue at an oblique viewing angle.

Example 6
Producing an Effect Pigment

The cholesteric liquid-crystal polymer employed is the polymer described in Example 5.

The polymer is milled to an average particle size of between 5 and 10 μm using an air-jet mill. A 30% dispersion of the milled material in isobutanol is prepared by stirring and the dispersion is drawn onto an aluminum foil with a coating bar whose gap width is 24 μm. Following the drying of the applied dispersion, the powder is baked at 270° C. for 5 minutes. The film has a green color which appears blue when viewed at an oblique angle. The cLCP layer is very well formed and homogeneous. The coat thickness is 8–11 μm. To produce the effect pigment, the cLCP-coated aluminum foil is placed in half-concentrated hydrochloric acid, and the aluminum carrier film dissolves to leave the cholesteric polymer film. The polymer particles are milled in a universal mill. In order to narrow the particle-size distribution, the milled material is passed through a sieve with a mesh width of 63 μm. The resulting effect pigment is incorporated into a 2-component clearcoat, applied by spraying to a black-primed metal panel, and covered with clearcoat. After baking, the coating has a green color which appears blue when viewed at an oblique angle.

What is claimed is:

1. A cholesteric liquid-crystalline polymer which in the molecule comprises at least one stabilizer comonomer selected from the group consisting of o-hydroxybenzophenone, 2-(o-hydroxyphenyl)-benztriazole, phenyl salicylate, a sterically hindered phenol, a sterically hindered amine, a phisphine, a phosphite, a phosphonite a thiocarboxylic ester, an alkyl sulfide, or a combination thereof.

2. The polymer as claimed in claim 1, which is a main-chain polymer from the group consisting of liquid-crystalline polyesters, polyamides, polycarbonates, polyesteramides or polyesterimides which comprise aromatic aminocarboxylic acids, aromatic, dicarboxylic acids, cycloaliphatic dicarboxylic acids and aromatic diols, cycloaliphatic diols, aromatic diamines and cycloaliphatic diamines and also one or more chiral, bifunctional comonomers.

3. The polymer as claimed in claim 2, wherein the main-chain polymer consists essentially of components a) to f):
   a) from 0 to 99 mol % of one or more compounds from the group consisting of aromatic hydroxycarboxylic acids, cycloaliphatic hydroxycarboxylic acids and aromatic aminocarboxylic acids;
   b) from 0 to 49.5 mol % of one or more compounds from the group consisting of aromatic dicarboxylic acids and cycloaliphatic discarboxylic acids;
   c) from 0 to 49.5 mol % of one or more compounds from the group consisting of aromatic diols, cycloaliphatic diols, aromatic diamines and cycloaliphatic diamines;
   d) from 0.95 to 40 mol % of chiral, bifunctional comonomers;
   e) from 0 to 15 mol % of a component having more than two functional groups; and
   f) from 0.05 to 10 mol % of one of said comonomers which acts as a stabilizer,
wherein the components have a sum of 100 mol % and wherein component a), component b), and component c) are not all zero at the same time.

4. The polymer as claimed in claim 2, wherein the chiral, bifunctional comonomer is isosorbide, isomannide, isoidide, camphoric acid, (D)- or (L)-methylpiperazine, (D)- or (L)-3-methyladipic acid, butane-2,3-diol or

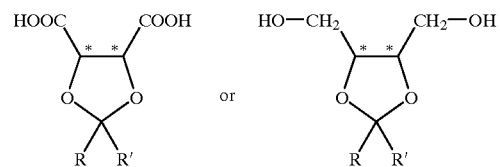

where R and R' each independently of one another are H, $C_1$–$C_6$-alkyl or phenyl.

5. The polymer as claimed in claim 1, which is a side-group polymer from the group consisting of polyesters or polyamides having mesogens, a chiral group and a comonomer from the group consisting of UV absorbers and antioxidants in the side group.

6. The polymer as claimed in claim 5, wherein the compounds on which the mesogens are based are of the formula (1)

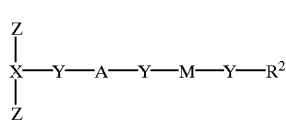

(1)

in which
   X can be $C_1$–$C_{12}$-alkyl, aryl, heteroaryl or diphenylmethyl,

Y is identical or different at each occurrence and is a chemical bond, O, S, COO, OCO, OCOO, CON(R) or N(R)CO, where R is hydrogen or $C_1$–$C_4$-alkyl, A is a chemical bond or a spacer from the group consisting of $C_1$–$C_{30}$-alkyl, where the alkyl chain optionally is interrupted by one or more groups of the formulae O, S, NH or $NCH_3$ and where the alkyl chain optionally is substituted by fluoro, chloro, bromo, cyano, methyl or ethyl, M is a mesogenic group, Z is a polycondensable group, which can be identical or different at each occurrence, and $R^2$ is a monovalent radical.

7. The polymer as claimed in claim 6, wherein Z is OH, COOH or $NH_2$.

8. The polymer as claimed in claim 6, wherein $R^2$ is H, $CH_3$, $C_2H_5$, $COCH_3$ or $C_6H_5$.

9. The polymer as claimed in claim 6, wherein M is a radical of the formula (2)

  (2)

in which the radicals

D independently of one another are $C_5$–$C_6$-cycloalkylene, an aromatic or heteroaromatic ring, which are unsubstituted or substituted by fluoro, chloro, bromo, cyano, methyl, methoxy or nitro;

$Y_1$ is O, COO, OCO, $CH_2O$, $OCH_2$, CH=N, N=CH or a direct bond, and r is a number from 0 to 3.

10. A process for preparing a cholesteric liquid-crystalline polymer which in the molecule comprises at least one stabilizer comonomer from the group consisting of UV absorbers and antioxidants, which comprises mixing the constituent monomers with one another and subjecting the mixture to polymerization, or comprises first preparing a nematic LCP and reacting it with a chiral polymerizable compound and a polymerizable stabilizer comonomer, or comprises first preparing a cholesteric LCP and reacting it with a polymerizable stabilizer comonomer, or comprises preparing a polymer blend comprising at least one cLCP and at least one LCP, which is nematic or cholesteric, comprising a stabilizer comonomer.

11. The process as claimed in claim 10, wherein the polymerizable stabilizer comonomer is a compound from the group

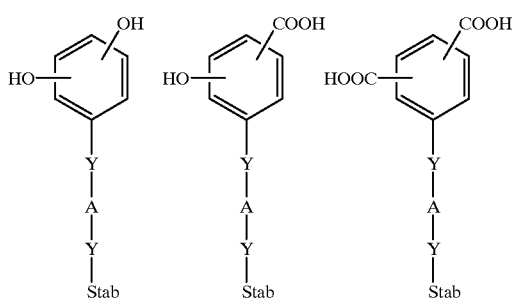

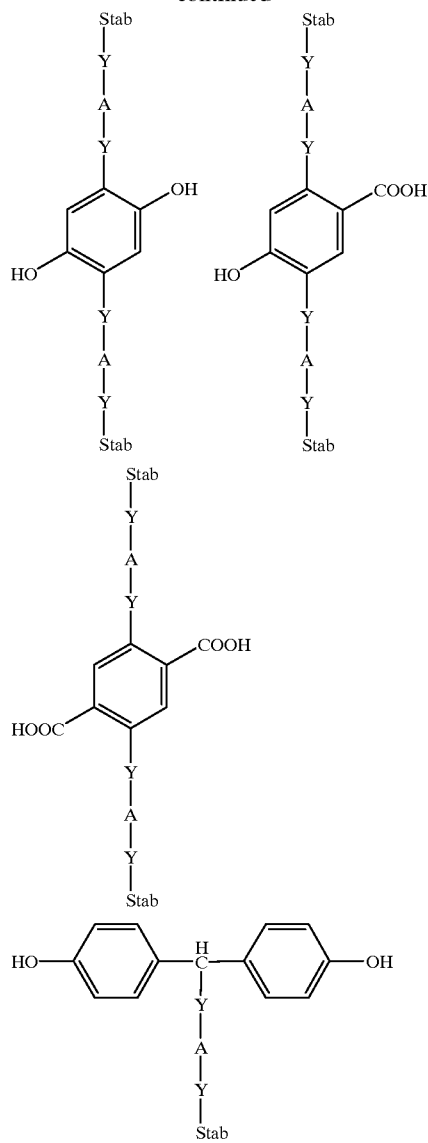

or of the formula (3)

H—Y—A—Y—Stab  (3)

in which

A is a chemical bond or a spacer from the group consisting of $C_1$–$C_{30}$-alkyl, where the alkyl chain optionally is interrupted by one or more groups of the formulae O, S, NH or $NCH_3$ and where the alkyl chain optionally is substituted by fluoro, chloro, bromo, cyano, methyl or ethyl, Y is identical or different at each occurrence and is a chemical bond, O, S, COO, OCO, OCOO, CON(R) or N(R)CO, where R is hydrogen or $C_1$–$C_4$-alkyl, and Stab is a radical of one of the stabilizer comonomers of the group consisting of o-hydroxybenzophenone, phenyl salicylate, a sterically hindered phenol, a sterically hindered amine, a phosphine, a phosphite, a phosphonite, a thiocarboxylic ester and alkyl sulfide.

12. The process as claimed in claim 10, wherein the polymerizable stabilizer comonomer employed is a compound of the formula (4)

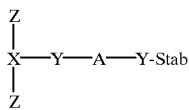 (4)

in which
- A is a chemical bond or a spacer from the group consisting of $C_1$–$C_{30}$-alkyl, where the alkyl chain optionally is interrupted by one or more groups of the formulae O, S, NH or $NCH_3$ and where the alkyl chain optionally is substituted by fluoro, chloro, bromo, cyano, methyl or ethyl,
- Y is identical or different at each occurrence and is a chemical bond, O, S, COO, OCO, OCOO, CON(R) or N(R)CO, where R is hydrogen or $C_1$–$C_4$-alkyl,
- X can be $C_1$–$C_{12}$-alkyl, aryl, heteroaryl or diphenylmethyl,
- Y A M is a mesogenic group, and
- Z is a polycondensable group, which can be identical or different at each occurrence, and
- Stab is a radical of one of the stabilizer comonomers of the group consisting of o-hydroxybenzophenone, phenyl salicylate, a sterically hindered phenol, a sterically hindered amine, a phosphine, a phosphite, a phosphonite, a thiocarboxylic ester and alkyl sulfide.

13. A method of coating a natural or synthetic material comprising the step of applying a polymer, which in the molecule comprises at least one stabilizer comonomer from the group consisting of UV absorbers and antioxidants, onto said material.

14. The method as claimed in claim 13, wherein the material is wood, metal or glass.

15. The method as claimed in claim 13, wherein the material is a body of motor vehicles.

* * * * *